J. I. LYLE & E. T. MURPHY.
HUMIDIFYING APPARATUS AND MEANS FOR CONTROLLING THE SAME.
APPLICATION FILED MAR. 22, 1911.
1,011,458.
Patented Dec. 12, 1911.
3 SHEETS—SHEET 3.
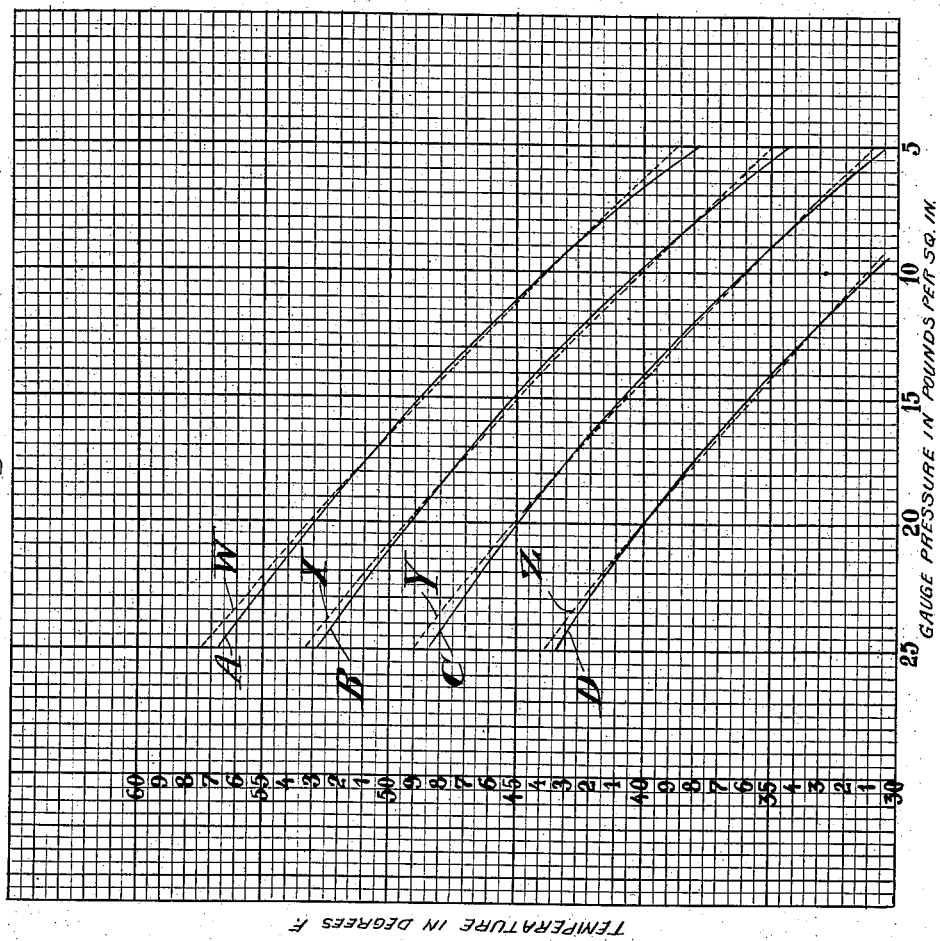

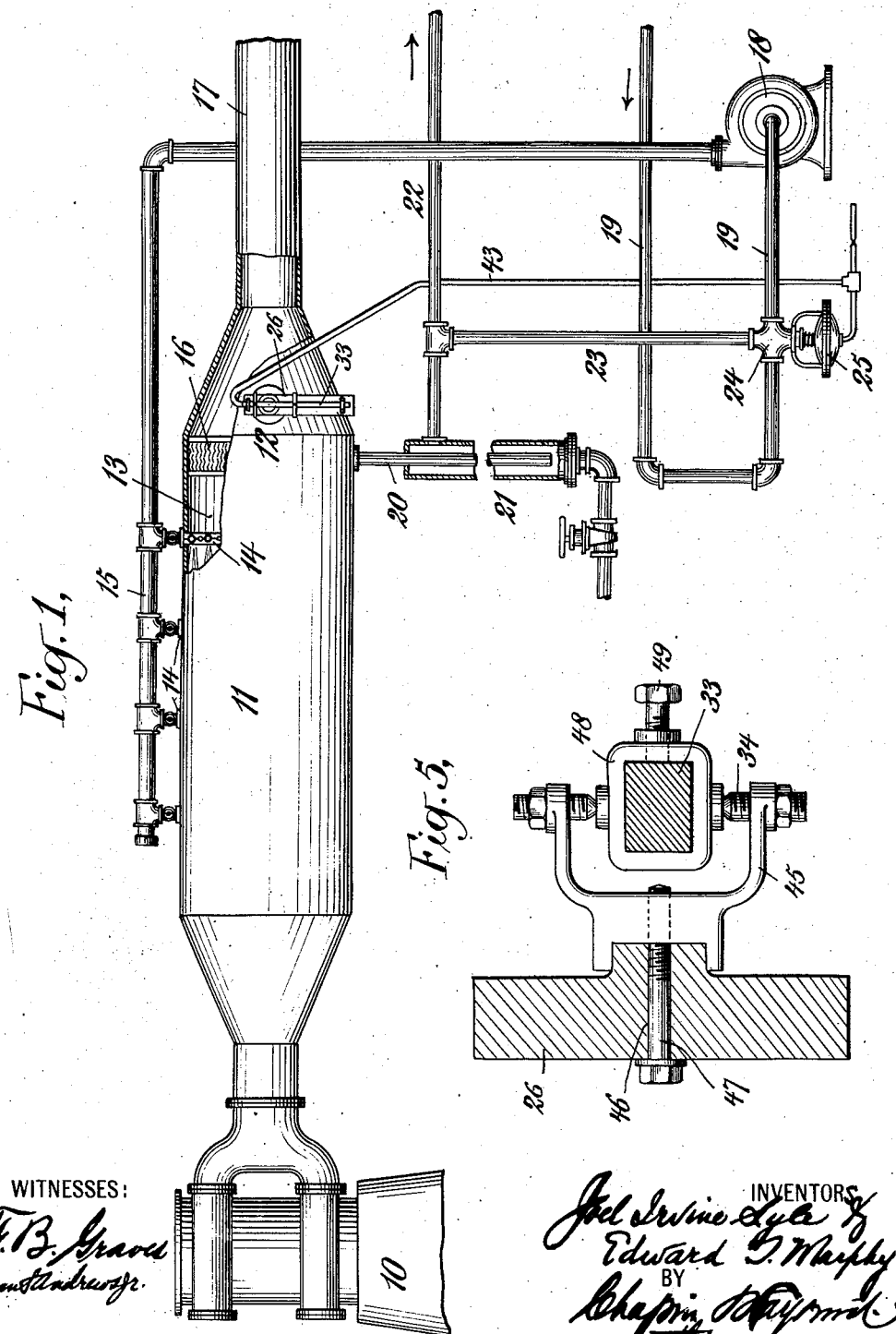

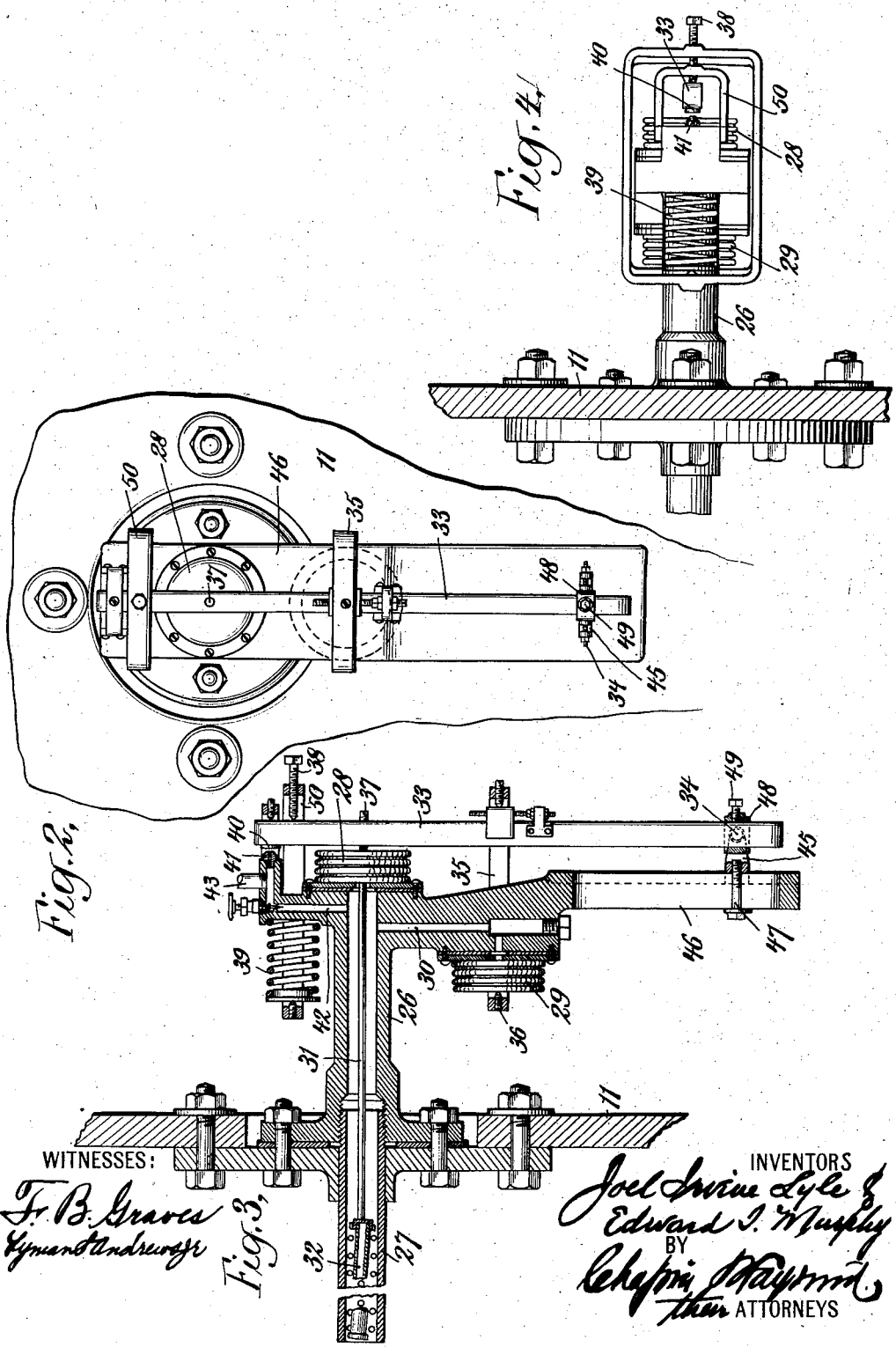

UNITED STATES PATENT OFFICE.

JOEL IRVINE LYLE, OF PLAINFIELD, NEW JERSEY, AND EDWARD T. MURPHY, OF PHILADELPHIA, PENNSYLVANIA.

HUMIDIFYING APPARATUS AND MEANS FOR CONTROLLING THE SAME.

1,011,458.     Specification of Letters Patent.     Patented Dec. 12, 1911.

Application filed March 22, 1911. Serial No. 616,077.

*To all whom it may concern:*

Be it known that we, JOEL IRVINE LYLE, a citizen of the United States of America, and a resident of Plainfield, county of Union, and State of New Jersey, and EDWARD T. MURPHY, a citizen of the United States of America, and a resident of Philadelphia, county of Philadelphia, and State of Pennsylvania, have invented certain new and useful Improvements in Humidifying Apparatus and Means for Controlling the Same, of which the following is a specification, reference being had to the accompanying drawings, forming a part thereof.

Our invention relates to means for maintaining a uniform moisture content in air, regardless of its pressure or temperature.

In metallurgical processes, such as those carried out in Bessemer converters, blast furnaces, and the like, wherein compressed air is passed through the molten metal, the varying conditions encountered render necessary the varying of the pressure of the air employed. The moisture content thereof, *i. e.*, the ratio of the moisture to the air by quantity or weight—the number of grains of moisture per pound of air—should however be kept uniform in accordance with the predetermined requirements, yet it must be borne in mind that the amount of moisture contained in dry saturated air, *i. e.*, dry air at its dew point, depends wholly upon the temperature of the air and not at all upon its pressure. For example, dry saturated air at 31 degrees temperature Fahrenheit will carry almost exactly two grains of moisture per cubic foot. Compress any amount of air into a single cubic foot of space, or rarefy the air in such space, and provided the same temperature of 31 degrees Fahrenheit be maintained, the same two grains of moisture will be the limit carried by the air when dry and fully saturated. Raise the temperature of the air at any pressure to say, 50 degrees Fahrenheit, and the amount of moisture carried under similar conditions of dryness and saturation (*i. e.* air at its dew point but with no free entrained water) will be almost exactly four grains for each cubic foot of space occupied.

As it is desirable for the sake of economy to regulate the moisture content of the air after its compression rather than before it, and the desired method of determining the moisture content in the air is to cool the air after compression to a predetermined point, and to saturate at such point, it will follow that to provide for a uniform predetermined moisture content under conditions of varying air pressures it becomes necessary to vary the temperature of the air at the time it is saturated as the pressure thereof varies. This would be a simple matter if the required temperature variations were directly proportionate to the pressure variations, but unfortunately they are not. For example, assume that the predetermined moisture content required be 21.5 grains of water vapor for each pound of air, the required relationship between the temperature of the air at its dew point, and the gage pressure thereof is as follows:

| Temperature in degrees Fahrenheit. | Gage pressure in pounds per square inch. |
|---|---|
| 36 | 6.3 |
| 38 | 7.95 |
| 41 | 10.8 |
| 43 | 12.75 |
| 47 | 17.35 |
| 50 | 21.10 |

To overcome the difficulty thus presented it has been suggested in the past to provide a compensating means in conjunction with means operated by the relative variation of the pressure and temperature of the air treated, so that the temperature thereof will be varied in the proper proportion to the variations in pressure thereof, to effect the result required. Such compensating means is undesirable, however, as lending additional and unnecessary complication to the apparatus, and it is the object of our present invention to so design, arrange, construct and equip the apparatus as to render its use unnecessary. We accomplish this by the employment of differentially operated fluid pressure means for controlling the temperature of the air, the said means being subjected upon one side to the pressure of the air being treated, and upon the other side to the pressure of the fluid, such as sulfur dioxid, whose expansion or increased pressure due to temperature increases, within the limits required, is substantially directly proportionate to the increase of the air pressure required under corresponding temperature increases of the air, to maintain the required substantially uniform moisture content in the air at its dew point, the said fluid being subjected to the temperature of the air at its dew point, so that it varies directly as the temperature of the air varies. As it is desirable that the apparatus be adjustable so that the amount of moisture to a given quantity of air may be predeterminedly varied, the said differential fluid pressure operated means may include a lever mechanism whose ratio may be varied at will, by hand, in favor of the air pressure or the temperature controlled fluid pressure, and a spring whose tension may also be varied.

In addition to the broad features of invention herein, many novel features of construction and combinations of parts, such as will be fully pointed out hereinafter, are also included, and in order that our invention may be fully understood we will now proceed to describe an embodiment thereof, having reference to the accompanying drawings illustrating the same, and will then point out the novel features in claims.

In the drawings: Figure 1 is a view generally in side elevation of an apparatus constructed in accordance with our invention, certain parts being broken away and other parts shown in central vertical section. Fig. 2 is a view in front elevation upon an enlarged scale of the regulating device employed, showing also a portion of the cooler to which it is attached. Fig. 3 is a view in central vertical longitudinal section through the parts shown in Fig. 2. Fig. 4 is a top view of the regulator with a portion of the cooler shown in horizontal section. Fig. 5 is a detail view in horizontal transverse section, upon the line 5—5 of Fig. 3. Fig. 6 is a diagrammatic view showing the characteristic curves representing the theoretical balancing value required for changes in pressure of the air being treated, together with the actual balancing value obtained in the use of the apparatus herein described, illustrating the same in connection with several relative humidities to be obtained.

The apparatus shown consists, in general, of a blowing engine 10 arranged to compress atmospheric air to the required extent, a humidifying and cooling apparatus 11 for receiving compressed air, and which may be termed a dew point cooler because of the fact that it is arranged to cool the air and deliver it at the required temperature in a fully saturated condition, and a regulator 12 for controlling the cooling apparatus in such a way as to determine the temperature at which the air is delivered therefrom. The air delivered from the dew point cooler will be conveyed to a Bessemer converter, blast furnace, or other apparatus in which it is to be employed, as will be well understood.

The dew point cooler comprises a substantially cylindrical shell including a chamber 13 in which are arranged a plurality of pipes 14 having spray nozzles therein, the pipes 14 constituting branches from a supply pipe 15 through which relatively cold water will be delivered for the purpose of cooling the compressed air delivered to the chamber 13 from the blowing engine 10, and supplying moisture thereto. Eliminator plates 16 are conveniently arranged near the forward end of the dew point cooler in order to entrap any entrained water, whereby the air discharged through the delivery pipe 17 will be dry, though thoroughly saturated, that is to say, while it will be at the dew point it will carry no free water with it.

The cooling water is supplied to the pipe 15 by means of a pump 18 or other suitable means, the supply pipe 19 of the pump connecting with the refrigerating device or other means from which water may be received at a low temperature. The dew point cooler is provided with a discharge pipe 20 for carrying away the water therein which has been used for cooling purposes, the temperature of which has been raised by its contact with the heated air. This pipe communicates through a water seal 21 with a return pipe 22 such as may lead back to the refrigerating machine to be again cooled therein, and then resupplied through the pipe 19 to the circulating pump 18. The return pipe 22 is provided with a branch 23 which leads to a mixing valve 24 arranged in the supply pipe 19. The mixing valve 24 is of such a character that in one position it will afford direct and open communication through the supply pipe 19 to the pump 18, cutting off communication from the branch pipe 23 therewith; in another position it will open communication between the branch pipe 23 and the portion of the supply pipe 19 leading from the mixing valve 24 to the pump 18, closing communication between this portion of the supply pipe and the portion thereof upon the other side of the mixing valve 24; and in intermediate positions it will open both of the said connections in varying proportions. By this it will be seen that water at any temperature from that of the fully cooled water from the refrigerating or other apparatus, to that of the relatively heated return water from the dew point cooler, may be supplied to the pump 18 in accordance with the position of the valve 24. The position of this valve is regulated by means of a fluid pressure motor 25 and the operation of the said fluid pressure motor 25 is controlled by means of the regulator 12. This regulator or controlling device includes a casing 26 which is secured to the shell of the dew point cooler, and is provided with a perforated tubular extension 27 which passes into the interior of the dew point cooler, being disposed in the path of the air currents therethrough after they have been cooled. The casing forms a support for two expansion chambers 28 and 29, the latter of which is in open communication through a channel 30 with the hollow interior of the casing 26, and thence through the interior of the tubular extension 27 with the interior of the dew point cooler, while the expansion chamber 28 connects through a pipe 31 with a closed chamber 32 located within the tubular extension 27. The expansion chamber 29 is thus in open and constant communication with the compressed air in the dew point cooler and is therefore directly influenced by the pressure of such air, while on the other hand the expansion chamber being in communication with a closed chamber 32, is in nowise directly affected by the pressure of the air. The chamber 32 is arranged to contain, however, a volatile liquid and as the said chamber is in direct contact with the cooled and compressed air in the dew point cooler it will follow that the pressure of the volatile liquid in the closed chamber will vary as the temperature of the air varies, and that such variations of pressure will be transmitted directly to the pressure chamber 28, and the pressure chamber 28 will be expanded in accordance therewith.

The two chambers 28—29 form two members of a fluid pressure device and they are coupled together by means of a lever 33. This lever is pivoted at 34 to a part relatively stationary with the frame or casing 26, and is connected to the pressure chamber 29 by means of a yoke 35 and set screw 36, and to the pressure chamber 28 by means of a set screw 37. The expansion of the chamber 28 tends to move the lever in a clockwise direction as viewed in Fig. 2, about a pivotal support 34, while the expansion of the chamber 29 tends to move the lever in an anti-clockwise direction, as will be well understood by reference to the drawings.

At its upper extremity the lever 33 is engaged by a set screw 38 which is carried by a link or yoke 50, the opposite end of which is acted upon by a spring 39. This spring is under normal compression and tends to force the lever inward, i. e., in a direction to the left as viewed in Fig. 2. At its extreme end the lever carries a portion 40 which in its engagement with a nipple 41 acts as a valve to open or close escape through the said nipple. This nipple is mounted in a portion of the casing 26 in which there is a channel 42 leading to the main opening therethrough, and hence is in open communication with the compressed air in the dew point cooler. A pipe 43 leads from this channel 42 to the fluid pressure motor 25 and by which compressed air is conducted to the fluid pressure motor for motive purposes. The passage 42 is restricted at the point 44 whereby the air will only pass therethrough a little at a time. If the nipple 41 be closed the compressed air in passing through the restricted opening will build up in the pipe 43 and in the fluid pressure motor to operate it in one direction, while on the other hand, if the lever 33 be moved to a position wherein there will be a free opening through the nipple 41, the air previously employed as motive fluid in the fluid pressure motor will be discharged therethrough, it being understood that the capacity of the nipple 41 is such as to permit the fluid motor to exhaust therethrough even while fresh motive fluid is being supplied through the passage 42 and restricted opening 44. In other words, the opening through the nipple is of larger capacity than the restricted opening 44.

For the purpose of adjusting the instrument 12 the pivotal point 34 or fulcrum of the lever 33 may be adjusted as may also the tension of the spring 39. The tension of the spring 39 is regulated by the adjustment of the set screw 38 as will be well understood, while the means by which the pivotal point 34 is adjusted includes a bracket 45 longitudinally movable along the casing extension 26 in which it is mounted, said casing extension having a slot 46 for receiving the bolt 47 by which the bracket 45 is secured in position, and a collar 48 which is mounted to slide longitudinally along the lever 33, a set screw 49 being provided for securing it in its adjusted position, the said collar 48 being pivotally mounted between extending arms of the bracket 45 (see Fig. 5).

The operation of the apparatus is as follows: First the tension of the spring 39 is regulated by the proper adjustment of the set screw 38 and the lever ratio is regulated by the proper adjustment of its fulcrum or pivotal center 34, as will be required for the particular humidity (relative quantity of moisture with respect to the air by weight or quantity) required. Then assuming the blowing engine 10 and the pump or circulating means 18 to be in operation, air will be compressed by the blowing engine and delivered to the dew point cooler wherein it will be cooled to the extent required by its pressure at the time, saturated, dried, and delivered to the discharge pipe 17. If the temperature to which the air is cooled in the dew point cooler is the proper one to maintain the proper moisture ratio at the pressure at which the air is being employed at the time, it is because the cooling water is being delivered at the proper temperature and the apparatus will work just as it is set. If the temperature, however, is too high the volatile liquid in the closed chamber will be expanded, and there will be an excess of pressure in the closed chamber 32 and consequently in the fluid pressure chamber 28. The lever 33 will, therefore, move to the right as shown in Fig. 2, the motive fluid will be vented through the nipple 41 from the motor 25, and the valve 24 will be moved to a position wherein it will admit a larger quantity of refrigerated water to the pump and a relatively smaller quantity of the relatively hot return water from the dew point cooler; the temperature of the water supplied to the dew point cooler will be lowered and the air in the dew point cooler will be cooled to the lower point required to maintain the required moisture ratio therein. On the contrary, if the temperature be too low the volatile liquid in the closed chamber will be contracted, the expansion chamber 28 will collapse, and the lever 33 will move under the influence of the spring 39 and the pressure upon the pressure chamber 29, to the left as viewed in Fig. 2; the nipple 41 will be closed and air under pressure will be admitted to the motor 25 to move the valve 24 in the other direction wherein a larger proportionate quantity of the relatively hot water and a smaller relative quantity of the refrigerated water will be delivered to the pump and by it delivered to the dew point cooler. By this means a balance will be constantly established in the fluid pressure operated means, whereby the extent to which the air is cooled will be in the proper proportion to the pressure of the air to maintain the proper moisture content therein, as has been explained above.

To comply with the foregoing conditions the expansible medium employed in the closed chamber 32 must be one whose expansion under temperature is in such direct proportion to the pressure increases of the air as are required by such temperature increases to effect the result aforesaid. We have found that sulfur dioxid fulfils these requirements with substantial accuracy within the ordinary limits required. For instance, assuming that it be required to maintain a moisture content equal to $21\frac{1}{2}$ grains per pound of air, or, in other words, 1.75 grains in a cubic foot of air at its dew point, at atmospheric pressure, the pivotal center or fulcrum of the lever 33 will first be adjusted so that the distance between it and the point at which the diaphragm 36 connects therewith is .585 of the distance between the said pivotal center or fulcrum 34 and the point at which the expansion chamber 28 connects with the lever, while the spring 39 will be adjusted so that it opposes a pressure of 6.56 pounds per square inch of the effective surface of the expansion chamber 28 against the movement of the lever, at the point at which the expansion chamber 28 connects therewith. Now assuming the gage pressure of the air (i. e., the pressure in pounds per square inch above atmospheric pressure) to be 7.95, the table given above shows that a temperature of 38 degrees Fahrenheit is required in order that the moisture content shall be exactly that called for. At a temperature of 38 degrees Fahrenheit the corresponding pressure which the sulfur dioxid will exert upon the lever 33 at the point 37 will be 11.2 pounds. Subtracting the spring resistance, viz., 6.56 pounds therefrom we have 4.64 pounds, and multiplying this by the lever ratio of 1 to .585 we have 7.95 pounds to counterbalance the air pressure at the point at which the expansion chamber 29 is connected with the lever. And this is the exact amount of pressure which is applied by the air thereto at the time. Between 36 and 50 degrees Fahrenheit in which the gage pressures corresponding thereto for maintaining $25\frac{1}{2}$ grains of water pressure per pound of air range from 6.3 pounds per square inch to 21.10 pounds per square inch as is shown in the table given above, the variation in gage pressures is not exceeding about .3 of a pound, or assuming the gage pressures to be accurate the variations in temperature from the exact requirements do not exceed .26 of a degree.

In the diagrammatic view Fig. 6 in which the vertical lines represent gage pressures in pounds per square inch, and the horizontal lines degrees of temperature Fahrenheit, the curved lines A—B—C—D represent the values at any point between the extremes thereof required to maintain a moisture content of 2 grains, 1.75 grains, 1.5 grains and 1.25 grains per cubic foot of saturated air at atmospheric pressure respectively, while the dotted lines W—X—Y—Z represent the values actually given by the use of sulfur dioxid, or similar fluid, acting upon the differential pressure means in accordance with the temperature of the air in opposition to the pressure of the air, the spring tension and lever ratio being also properly adjusted for the relative humidity required. It will be noted that the lines W—A, X—B, Y—C, and Z—D respectively very nearly coincide and that their divergence from actual coincidence within the limits of ordinary use is so small as to be substantially negligible. It will of course be understood that any volatile liquid whose tension curve representing changes in pressure resulting from temperature changes parallels or approximates the pressure curve of air such as represents the increments of pressure increase therein which will maintain a substantially uniform moisture content in the air at its dew point, such as does sulfur dioxid, will be the precise equivalent of sulfur dioxid when used in the present apparatus, and hence in referring to sulfur dioxid herein it will be understood that the term is not only intended to apply to sulfur dioxid itself but also to any other volatile liquids which are the equivalent thereof in the above sense.

It will be readily understood that the regulating device may be graduated to indicate the necessary adjustments of the lever fulcrum, and of the spring for the different humidity requirements. For instance, when the machine is adjusted to maintain 2 grains of moisture in a cubic foot of saturated air at atmospheric pressure, the lever ratio will be as 1 is to .525, while the spring resistance will be 8.45 pounds per square inch of the effective surface of the expansion chamber 28 upon the lever. At 1.75 grains relative humidity the lever ratio will be .585 as aforesaid, and the spring resistance 6.56 as also stated above. At 1.50 grains relative humidity the lever ratio will be as 1 is to .538, while the spring resistance will be 4.68; while for 1.25 grains humidity the lever ratio will be as 1 is to 4.74 and the spring resistance will be 2.86 and so on.

What we claim is:

1. Means for varying the temperature of the air in air humidifying and cooling apparatus, as the pressure thereof varies, comprising a differential fluid pressure operated means, means for subjecting one side thereof to the pressure of the air, means for subjecting the other side thereof to the pressure of a fluid whose pressure increases upon increase of its temperature, in substantially direct proportion to the increase of air pressure required under corresponding temperature increases of the air, to maintain a substantially uniform moisture content in the air at its dew point, and means controlled by the operation of the said differential fluid pressure means to vary the temperature of the air.

2. Means for varying the temperature of the air in air humidifying and cooling apparatus as the pressure thereof varies, comprising a differential fluid pressure operated means, means for subjecting one side thereof to the pressure of the air, an adjustable spring for acting upon the fluid pressure operated means in the same direction, means for subjecting the other side thereof to the pressure of a fluid whose pressure increases upon increase of its temperature in substantially direct proportion to the increase of air pressure required under corresponding temperature increases of the air to maintain a substantial uniform moisture content in the air at its dew point, and means controlled by the operation of the differential fluid pressure means to vary the temperature of the air.

3. Means for varying the temperature of the air in air humidifying and cooling apparatus as the pressure thereof varies, comprising a differential fluid pressure operated means, means for subjecting one side thereof to the pressure of the air, an adjustable spring for acting upon the fluid pressure operated means in the same direction, means for subjecting the other side thereof to the pressure of a fluid whose pressure increases upon increase of its temperature in substantially direct proportion to the increase of air pressure required under corresponding temperature increases of the air to maintain a substantially uniform moisture content in the air at its dew point, means for adjusting the relative effective force upon the fluid pressure operated means by the air and the said fluid, and means controlled by the operation of the differential fluid pressure means to vary the temperature of the air.

4. Means for varying the temperature of the air in air humidifying and cooling apparatus, as the pressure thereof varies, comprising a differential fluid pressure operated means, means for subjecting one side thereof to the pressure of the air, means for subjecting the other side thereof to the pressure of sulfur dioxid whose temperature corresponds to that of the air, and means controlled by the operation of the said differential fluid pressure means to vary the temperature of the air.

5. Means for varying the temperature of the air in air humidifying and cooling apparatus as the pressure thereof varies, for the purpose of maintaining a uniform moisture content in the air, comprising a differential fluid pressure operated means, a closed chamber containing sulfur dioxid and arranged in communication with the said pressure means upon one side thereof, the said closed chamber being located in the path of the cooled air, the other side of the said differentially operated pressure means being subjected directly to the pressure of the cooled air.

6. Means for varying the temperature of the air in air humidifying and cooling apparatus as the pressure thereof varies, for the purpose of maintaining a uniform moisture content in the air, including a dew point cooler and a regulating means therefor comprising a lever, an expansion chamber engaging the lever at one point along the same, a closed chamber containing sulfur dioxid and arranged in communication with the said expansion chamber, the said closed chamber being arranged in the dew point cooler in the path of the cooled air currents therein, another expansion chamber engaging the lever at another point along the same and in opposition to the first said expansion chamber, the second said expansion chamber being in communication with the air, and acted upon by the pressure thereof, a manually adjustable spring, bearing against the lever in the direction in which the second said expansion chamber engages the same, and manually adjustable means for varying the position of the lever fulcrum.

7. Means for varying the temperature of the air in air humidifying and cooling apparatus as the pressure thereof varies, for the purpose of maintaining a uniform moisture content in the air, including a dew point cooler, means for supplying a cooling medium thereto, and a regulator for varying the temperature of the cooling medium supplied to the cooler as the pressure of the air in the cooler varies, the said regulator comprising a lever, an expansion chamber engaging the lever at one point along the same, a closed chamber containing sulfur dioxid, arranged in communication with the said expansion chamber, the said closed chamber being arranged in the dew point cooler in the path of the cooled air currents therein, another expansion chamber engaging the lever at another point along the same and in opposition to the first said expansion chamber, the second said expansion chamber being in communication with the air in the dew point cooler and acted upon by the pressure thereof, a manually adjustable spring bearing against the lever in the direction in which the second said expansion chamber engages the same, and manually adjustable means for varying the position of the lever fulcrum.

JOEL IRVINE LYLE.
EDWARD T. MURPHY.

Witnesses:
D. HOWARD HAYWOOD,
LYMAN S. ANDREWS, Jr.